United States Patent
Takimoto (10) Patent No.: US 7,458,511 B2
(45) Date of Patent: Dec. 2, 2008

(54) ACCESS DEVICE FOR DATA-HOLDING BODY AND ELECTRONIC EQUIPMENT INCORPORATING THE ACCESS DEVICE

(75) Inventor: Tsuyoshi Takimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 11/041,249

(22) Filed: Jan. 25, 2005

(65) Prior Publication Data

US 2006/0076405 A1   Apr. 13, 2006

(30) Foreign Application Priority Data

Oct. 8, 2004   (JP) .............................. 2004-296321

(51) Int. Cl.
*G06K 5/00*   (2006.01)
(52) U.S. Cl. ...................... 235/382; 235/492
(58) Field of Classification Search ................ 235/382, 235/380, 492, 493, 449; 343/866, 666
See application file for complete search history.

(56) References Cited

U.S. PATENT DOCUMENTS

| | | | |
|---|---|---|---|
| 3,798,059 A | 3/1974 | Astle et al. | |
| 4,960,983 A | 10/1990 | Inoue | |
| 5,694,139 A | 12/1997 | Saito et al. | |
| 6,646,554 B1 * | 11/2003 | Goff et al. | 340/572.6 |

FOREIGN PATENT DOCUMENTS

| | | |
|---|---|---|
| DE | 38 24 870 | 4/1989 |
| DE | 42 21 305 | 11/1993 |
| DE | 695 26 699 | 12/2002 |
| JP | 2001-229347 | 8/2001 |
| JP | 2002-175551 | 6/2002 |
| JP | 2002-298095 | 10/2002 |
| WO | WO 92/21105 | 11/1992 |

OTHER PUBLICATIONS

German Patent Office Action, mailed Aug. 9, 2006, and issued in corresponding German Patent Application No. 10 2005 007 528.2—53.

* cited by examiner

*Primary Examiner*—Daniel St.Cyr
(74) *Attorney, Agent, or Firm*—Staas & Halsey LLP (57) ABSTRACT

A reader/writer module for IC cards, employing a magnetic sheet that suppresses the interference with a metallic member yet reduced in thickness. A reader/writer for non-contact IC cards or the reader/writer module for IC cards equipped with the reader/writer for non-contact IC cards, is incorporated in a housing of an electronic equipment. A magnetic sheet is secured to a predetermined region on one surface of the module substrate, a loop antenna is arranged on the magnetic sheet, and a circuit component connected to the loop antenna is mounted on a region outside the magnetic sheet of the module substrate.

7 Claims, 12 Drawing Sheets

ACCESS DEVICE FOR DATA-HOLDING BODY AND ELECTRONIC EQUIPMENT INCORPORATING THE ACCESS DEVICE

CROSS-REFERENCE TO RELATED APPLICATION

This application claims priority from, and incorporates by reference to, the entire disclosure of Japanese Patent Application No. 2004-296321 filed on Nov. 8, 2004.

BACKGROUND OF THE INVENTION

1. Field of the Invention

The present invention relates to an access device for a data-holding body, such as a reader/writer module for IC cards, and to electronic equipment incorporating the access device. More specifically, the invention relates to a reader/writer module for IC cards having a reduced thickness and to electronic equipment incorporating the reader/writer module for IC cards. The equipment is not increased in the size as a result of using the IC card reader/writer.

2. Description of the Related Art

In recent years, there have been widely employed user authentication and electronic money using cards such as credit cards and services such as point cards. As such cards, there have heretofore been used magnetic cards having a magnetic stripe. However, the data recorded in the magnetic stripe can be erased by the application of an intense magnetic field and are, further, liable to be used without authorization by being read by a third person by using a magnetic reader.

There have further been widely used IC cards incorporating an IC therein and exposing terminals for connection to the input/output terminals of the IC on the surface of the cards to substitute for the magnetic cards. By using the card incorporating the IC, however, the data recorded in the IC must be read out by using a reader/writer of the contact type making it necessary to insert the IC card in the reader/writer and, hence, requiring a reading operation.

Therefore, it has been urged to provide a non-contact type IC card that need not be brought into contact with the reader/writer to substitute for the conventional magnetic cards and the IC cards of the contact type. The IC cards of the non-contact type are now available as commuter's tickets and prepaid tickets for railways and buses, and as prepaid electronic money which can be used at specified shops.

The non-contact type IC card contains an IC chip, a peripheral circuitry and a loop antenna, and works upon trapping very weak electromagnetic waves, from the reader/writer which is also equipped with an antenna, and sends the data recorded in the IC chip back to the reader/writer through the antenna. To further spread the use of the non-contact type IC cards, attempts have been made to incorporate the reader/writer for the non-contact type IC card in various electronic equipment such as a personal computer.

The non-contact type IC card has no connection terminal, and it is possible that a good communication cannot be accomplished depending upon the positional relationship between IC card and the reader/writer. Some conventional reader/writer modules use large antenna enabling the users to accomplish favorable communication without the need of giving much attention to the positioning between the IC card and the reader/writer module. In other cases, further, the electromagnetic output power is increased to accomplish good communication. In a reader/writer using a small antenna and suppressing the output power, further, attempts have been made to provide a rack for placing the IC card enabling the user to correctly position the IC card as employed in some convenience stores.

To accomplish favorable communication by using a loop antenna employed by the non-contact type IC cards, however, attention must be given not to arrange a metallic member that blocks the transmission/reception of electromagnetic waves on the upper and lower sides, on the right and left sides, or on the back of the antenna of the reader/writer. When it is necessary to arrange a metallic member just under the antenna of the reader/writer, a magnetic sheet must be inserted between the antenna and the metallic member.

Japanese Unexamined Patent Publication (Kokai) No. 2002-298095 discloses an example of sticking a flexible sheet-like magnetic body under the antenna coil or onto the back of the casing of the reader/writer for communicating the data with the IC card.

In the conventional reader/writer module for IC cards, the loop antenna is mounted on the substrate by means such as printing or adhesion, and a circuit component including the IC chip having memory for recording data is mounted by the side of the loop antenna. When it is necessary to arrange the reader/writer on a portion where a metallic member is arranged just under the loop antenna of the reader/writer, a magnetic sheet is stuck to the back surface of the substrate corresponding to the loop antenna to prevent the effect of the metallic member.

When it is attempted to employ a large antenna or to increase the output power, however, it becomes difficult to keep the size of the device small. According to the method of providing the housing with a rack for positioning the card, the rack could become an obstacle when the reader/writer is incorporated in a place on where the user usually puts his hand, such as a palm rest portion or the like of a notebook personal computer. When the reader/writer is incorporated in a small electronic equipment, further, it may become necessary to provide the magnetic sheet on the back surface of the antenna to suppress the interference with the metallic member causing an increase in the thickness of the reader/writer module and making it difficult to incorporate it in small electronic equipment.

SUMMARY OF THE INVENTION

It is an object of the present invention to provide an access device for data-holding body, such as a reader/writer module or IC cards, that can be easily mounted in small electronic equipment which cannot use a large antenna or to increase the output power, the access device not increasing in thickness despite of employing a magnetic sheet for suppressing interference with a metallic member.

Another object of the present invention is to provide electronic equipment incorporating the access device, which, when the user holds the data-holding body thereon, enables the user to visually recognize the position on the electronic equipment where the data-holding body is to be held, so that the data-holding body can be reliably guided onto the position.

In order to achieve the above objects, the access device for data-holding body of the invention has a function for reading a data-holding body that is accessible in a non-contacting manner and/or a function for writing thereon, comprising a magnetic layer provided on a predetermined region on one surface of the substrate of the device, an antenna supported on the magnetic layer, and a circuit component connected to the antenna on a region away from the magnetic layer on the substrate.

In the access device for the data-holding body, the antenna can be formed on the flexible circuit board so as to be arranged on the magnetic layer. Further, the magnetic layer mounting the antenna and the circuit component, can be mounted on the substrate being arranged side by side.

In electronic equipment incorporating the access device for data-holding body of the invention for achieving the above object, the access device in the data processor is incorporated in a housing constituting the equipment at a position where the data-holding body can be held.

In the electronic equipment, the housing of the electronic equipment of a portion where the access device is incorporated is evenly swollen in the shape of the data-holding body, such that the data-holding body can be placed thereon, and the access device is incorporated on the side of the back surface of the swollen portion. Further, the housing of the electronic equipment of the portion where the access device is incorporated may be marked to indicate the position where the data-holding body is to be held.

Further, the magnetic layer mounting the antenna of the access device can be positioned on a portion close to the edge of the housing, enabling the data-holding body to be accessible in a state where part of the data-holding body is positioned on the outer side of the housing. The electronic equipment may be a notebook computer.

Further, when the electronic equipment is a notebook computer, the swollen portion is provided on the palm rest portion neighboring the keyboard, and the height of the swollen portion is selected to be not larger than a step between the display of the computer and a frame portion surrounding the display.

According to the access device for the data-holding body of the present invention, the magnetic layer mounted on the substrate also works to support the antenna, making it possible to decrease the thickness of the access device and to simplify the mounting method and to improve the quality of communication. According to the electronic equipment incorporating the access device for data-holding body of the invention, the data-holding body possessed by a user can be visually and correctly guided to a position where the data-holding body is to be held.

BRIEF DESCRIPTION OF THE DRAWINGS

The present invention will be more clearly understood from the description set forth below with reference to the accompanying drawings, wherein.

DESCRIPTION OF THE PREFERRED EMBODIMENTS

Before describing the preferred embodiments, an explanation will be given of the conventional IC card reader/writer shown in FIGS. 1A to 1C.

Figure 1A:
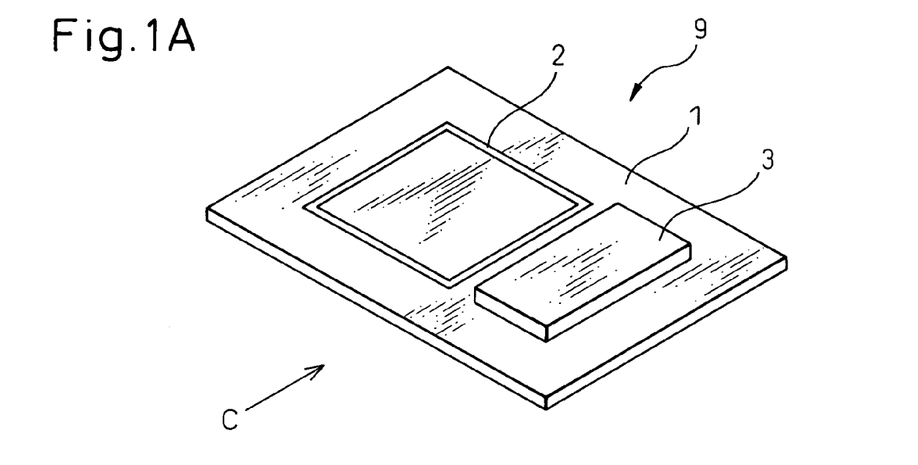
FIG. 1A is a perspective view of a conventional reader/writer module for IC cards viewed from the upper side.
Figure 1B:
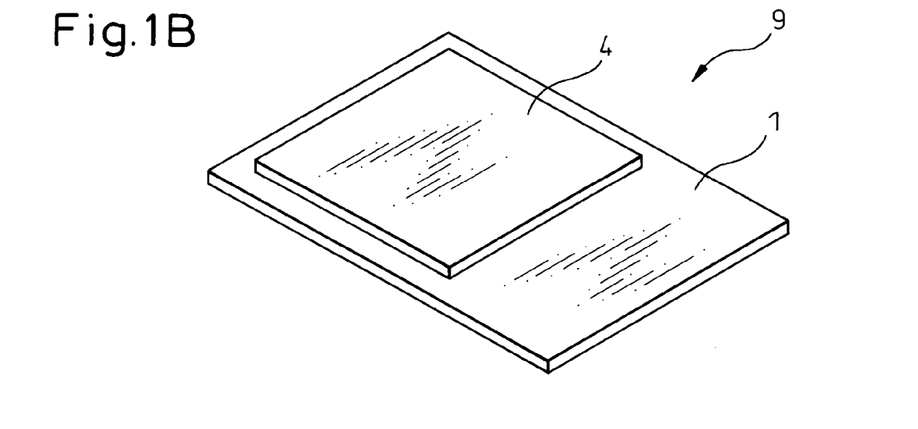
FIG. 1B is a perspective view of the reader/writer module for IC cards shown in FIG. 1A viewed from the side of the back surface.
Figure 1C:
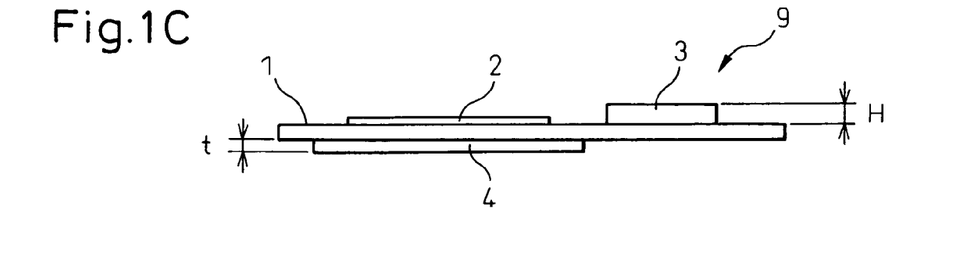
FIG. 1C is a side view of the reader/writer module for IC cards shown in FIG. 1A viewed from the direction of an arrow C.

FIGS. 1A to 1C illustrate the constitution of a conventional reader/writer module 9 for IC cards incorporated in the reader/writer. Referring to FIG. 1A, the conventional reader/writer module 9 for IC cards has a loop antenna 2 mounted on a substrate 1 by printing or adhesion, and a circuit component 3 including an IC chip provided with a memory for recording data is mounted by the side of the loop antenna 2. When the reader/writer 9 must be arranged on a portion where a metallic member is arranged just under the loop antenna 2 of the reader/writer 9, a magnetic sheet 4 is stuck to the back surface of the substrate 1 corresponding to the loop antenna 2 as shown in FIGS. 1B and 1C in order to prevent an effect of the metallic member.

When it is attempted to employ a large antenna or to increase the output power, however, it becomes difficult to keep the size of the device small. According to the method of providing the housing with a rack for positioning the card, the rack could become an obstacle when the reader/writer is incorporated in a place on where the user usually puts his hand, such as a palm rest portion or the like of a notebook personal computer. When the reader/writer is incorporated in a small electronic equipment, further, it may become necessary to provide the magnetic sheet on the back surface of the antenna to suppress the interference with the metallic member causing an increase in the thickness of the reader/writer module and making it difficult to incorporate it into small electronic equipment.

Figure 2A:
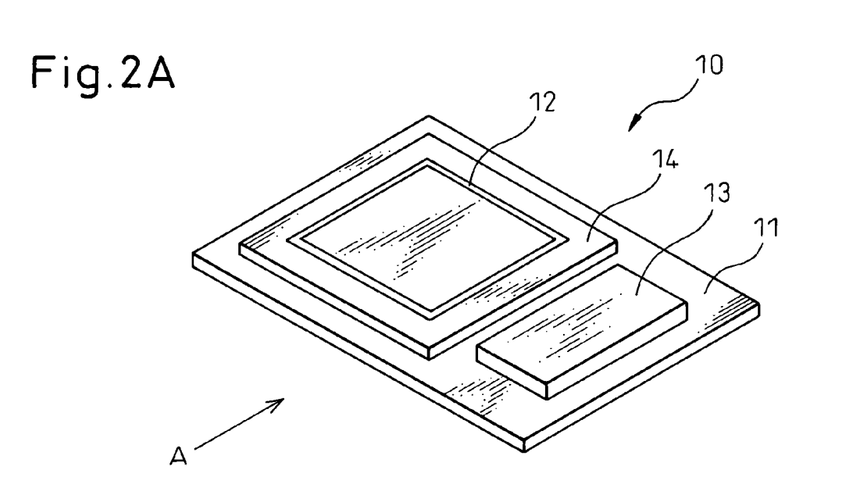
FIG. 2A is a perspective view of a reader/writer module for IC cards according to an embodiment of the present invention viewed from the upper side.

FIG. 2A is a perspective view of a reader/writer module 10 for IC cards, which is an access device for the data-holding device according to an embodiment of the present invention, viewed from the upper side. In the reader/writer module 10 for the IC cards of this embodiment, a magnetic sheet 14 is secured onto the module substrate 1 by such means as adhesion, so that the transmission/reception performance of the antenna will not be affected when there is a metallic member on the back surface side of the module substrate 1. A loop antenna 12 supported by the magnetic sheet 14 is arranged on the upper surface of the magnetic sheet 14, and a circuit component 13 connected to the loop antenna 12 is mounted on the module substrate 11 on a portion neighboring the magnetic sheet 14.

Figure 2B:
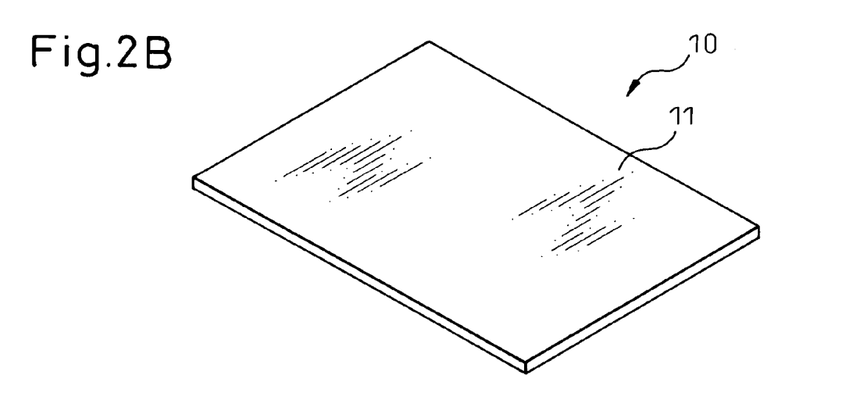
FIG. 2B is a perspective view of the reader/writer module for IC cards shown in FIG. 2A viewed from the side of the back surface.
Figure 2C:
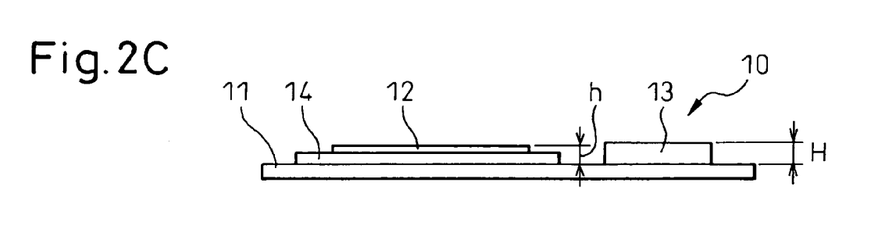
FIG. 2C is a side view of the reader/writer module for IC cards shown in FIG. 2A viewed from the direction of an arrow A.

As shown in FIG. 2B, therefore, nothing is provided on the back surface of the module substrate 11. In the reader/writer module 10 for IC cards of this embodiment as shown in FIG. 2C, a height h of the magnetic sheet 14 and of the loop antenna 12 from the module substrate 11 is smaller than a height H of the circuit component 3 from the module substrate 11. Therefore, the reader/writer module 10 for IC cards of this embodiment has a thickness smaller by the height t of the magnetic sheet 14 than that of the conventional reader/writer module 9 for IC cards shown in FIGS. 1A to 1C.

Figure 3A:
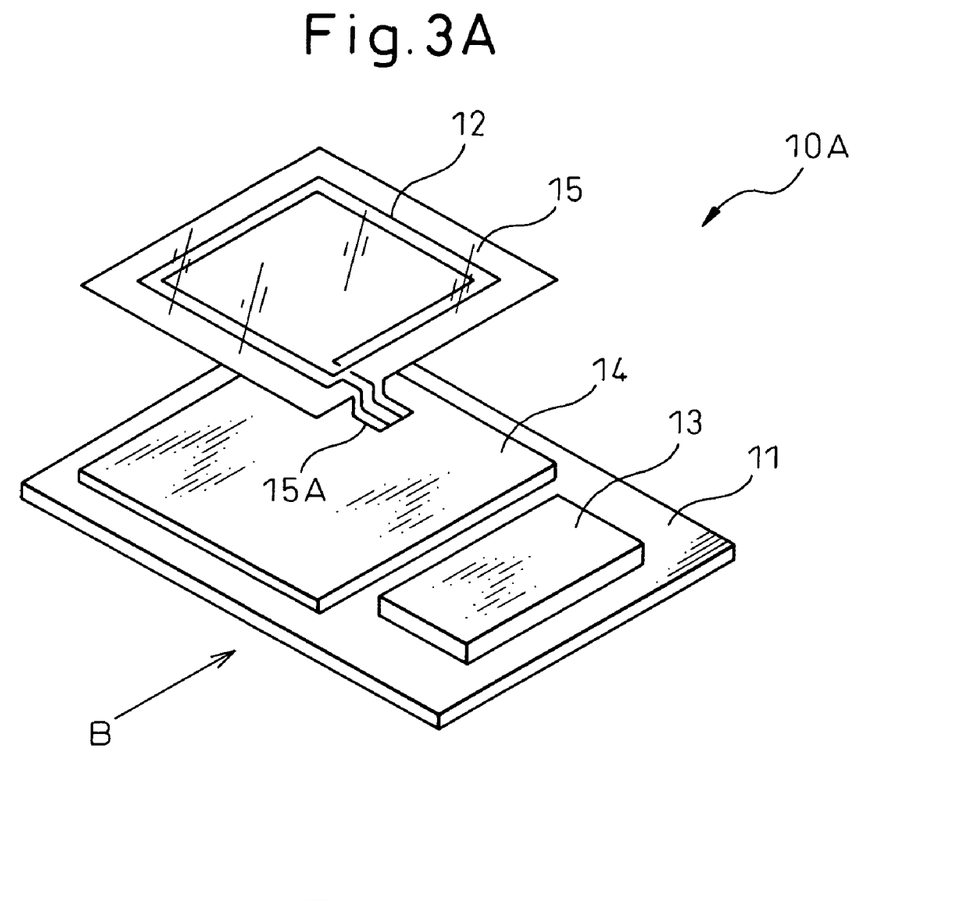
FIG. 3A is a perspective view of an assembly illustrating the constitution of a modified embodiment of the reader/writer module for IC cards shown in FIG. 2A.
Figure 3B:
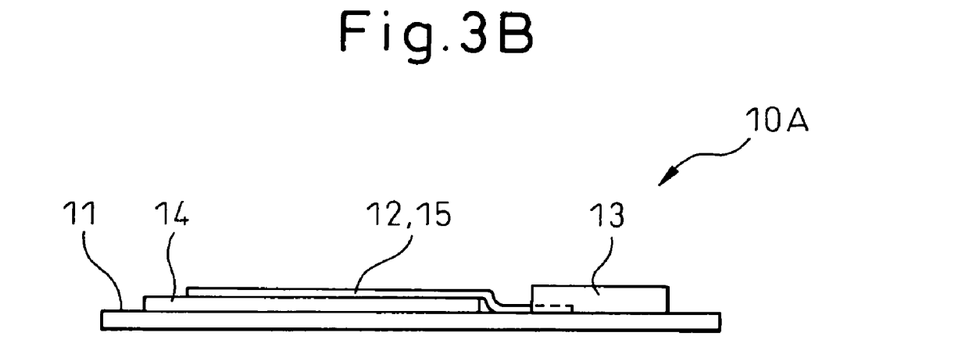
FIG. 3B is a side view of the reader/writer module for IC cards shown in FIG. 3A viewed from the direction of an arrow B.

FIGS. 3A and 3B illustrate a reader/writer module 10A for IC cards, which is modified from the reader/writer module 10 for IC cards shown in FIGS. 2A to 2C. In the above-mentioned embodiment, the loop antenna 12 constituted by a winding is mounted, on the upper surface of the magnetic sheet 14, by adhesion. In this embodiment, on the other hand, the loop antenna 12 is formed in a flexible circuit board 15 which is mounted on the upper surface of the magnetic sheet 14.

The flexible circuit board 15 is provided with a terminal portion 15A forming a feeder terminal of the loop antenna 12, the terminal portion 15A being connected to the circuit component 13 as shown in FIG. 3B.

Figure 4A:
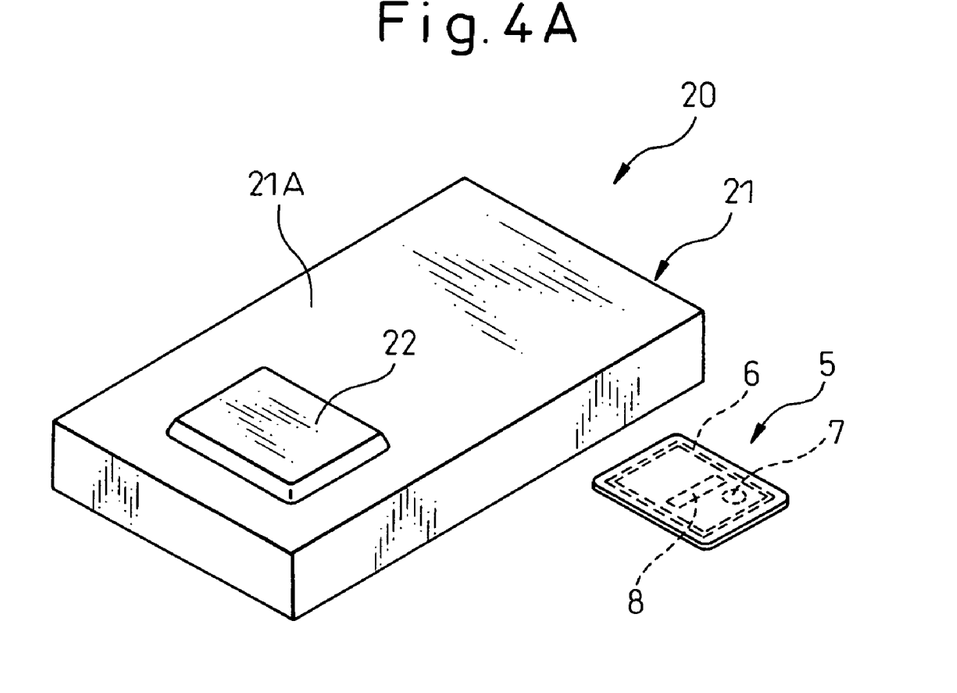
FIG. 4A is a perspective view illustrating a state where an IC card is held against electronic equipment of an embodiment of the invention incorporating the reader/writer module for IC cards of the invention.

FIG. 4A illustrates a state where an IC card 5 is held against electronic equipment 20 of the embodiment of the invention incorporating the reader/writer module 10 or 10A for IC cards of the invention. The electronic equipment 20 of this embodiment is provided with a swollen portion 22 having the same shape as that of the IC card 5 on the upper surface 21A of a housing 21 thereof. The electronic equipment 20 serves as an input/output device for other data processors, and is connected to the data processors through a wire, or in a wireless manner, to exchange data with the data processors. Therefore, the electronic equipment 20 may further incorporate circuit components (which may be known ones and are not described here) necessary for exchanging data with the data processors, in addition to incorporating the circuit component 3 or 13 mounted on the reader/writer module 10 or 10A. The IC card 5 usually incorporates a loop antenna 6, an IC chip 7 and a peripheral circuit 8 including a memory. Instead of forming a swollen portion 22 on the upper surface 21A of the housing 21, further, a recessed portion may be formed to receive the IC card 5 as shown in FIG. 4C, or a mark 25 representing the outer shape of the IC card 5 may be formed as shown in FIG. 4E. The depth of the recessed portion 22B may be smaller than the thickness of the IC card 5, and a groove 24 may be additionally formed along the edge thereof for taking out the IC card 5.

Figure 4B:
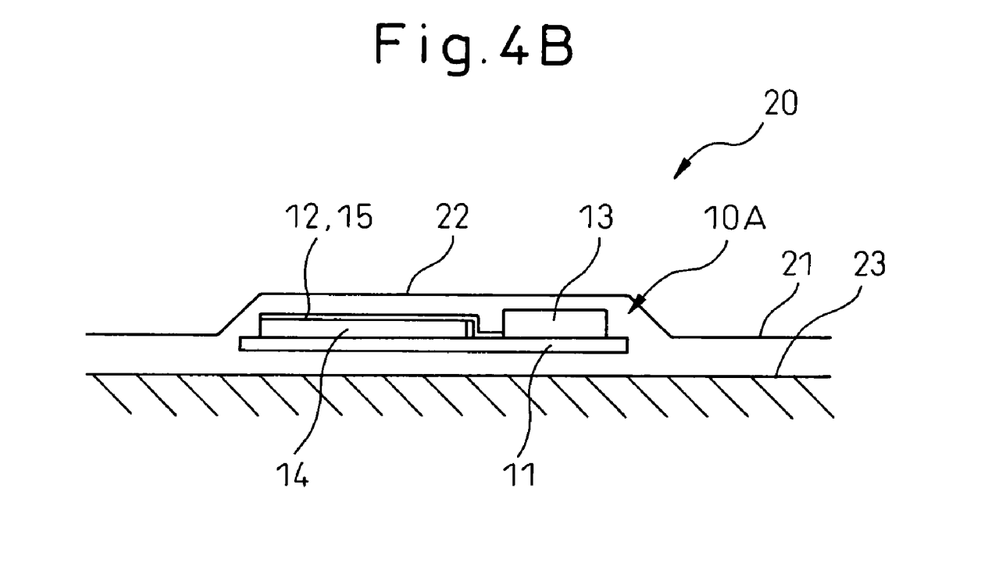
FIG. 4B is a partial sectional view of the electronic equipment shown in FIG. 4A.
Figure 4C:
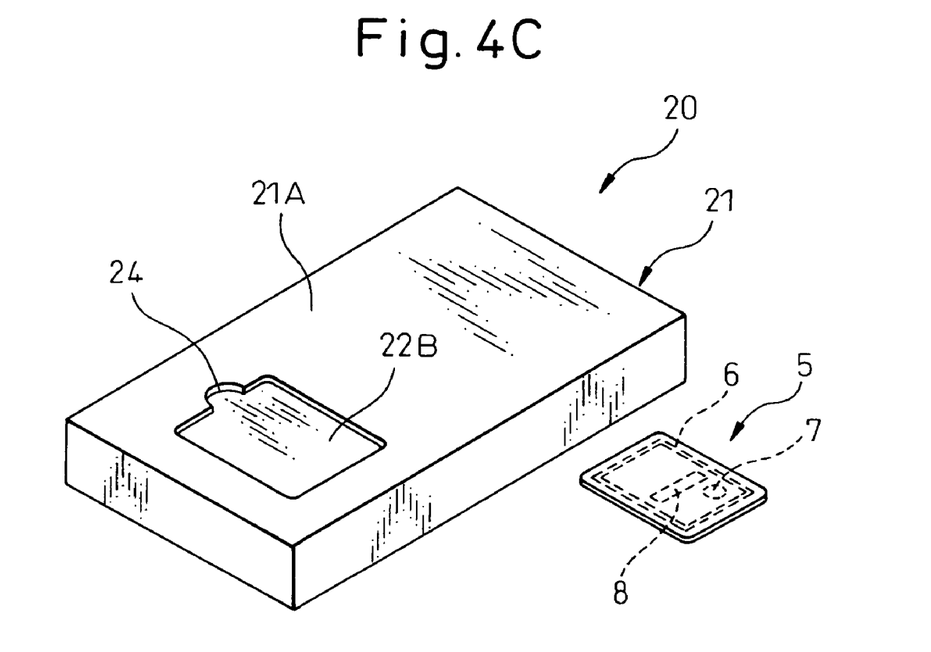
FIG. 4C is a perspective view illustrating a state where an IC card is held against the electronic equipment of another embodiment of the invention incorporating the reader/writer module for IC cards of the invention.
Figure 4D:
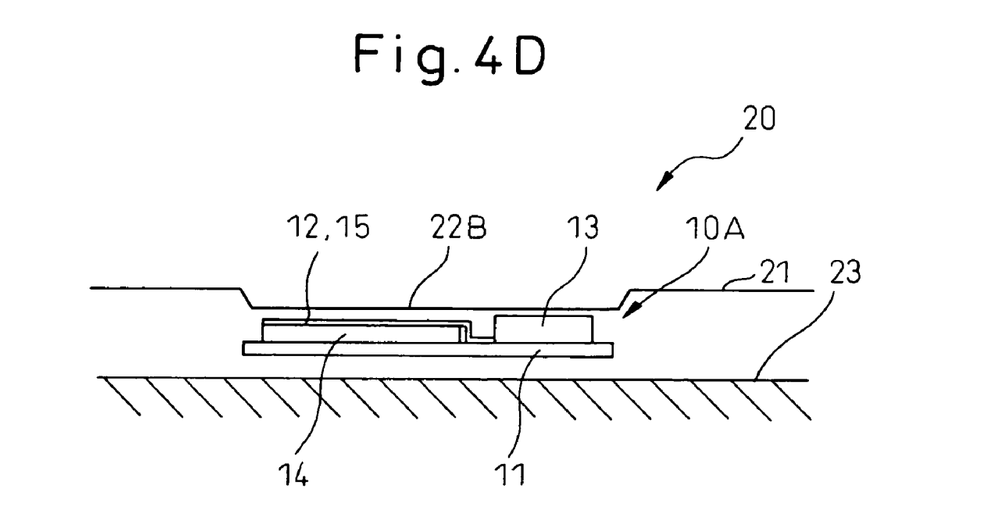
FIG. 4D is a partial sectional view of the electronic equipment shown in FIG. 4C.
Figure 4E:
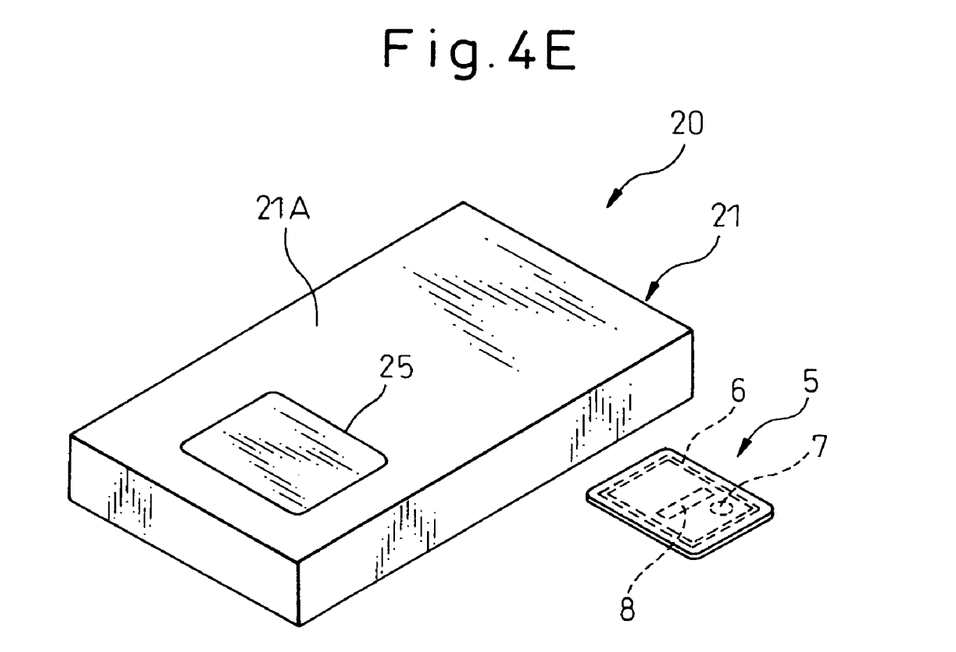
FIG. 4E is a perspective view illustrating a state where an IC card is held against the electronic equipment of a further embodiment of the invention incorporating the reader/writer module for IC cards of the invention.
Figure 4F:
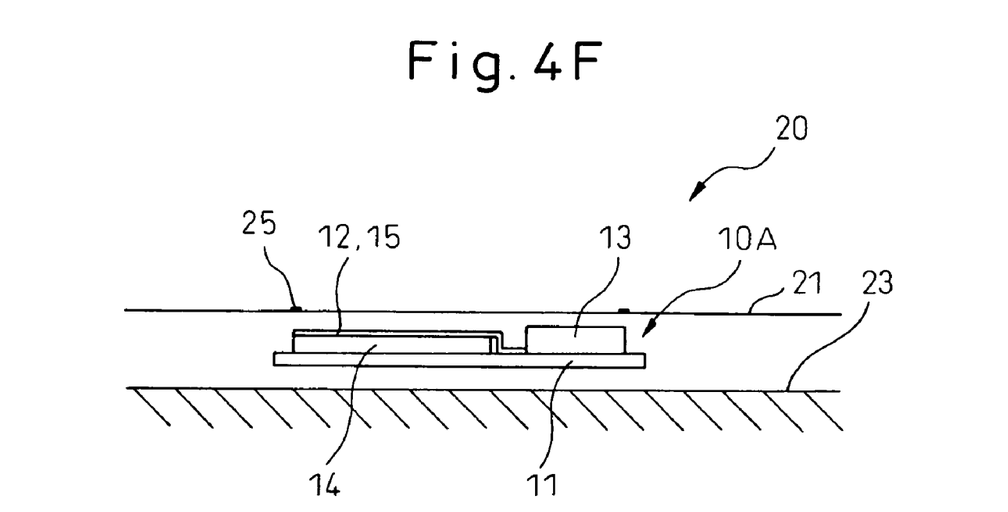
FIG. 4F is a partial sectional view of the electronic equipment shown in FIG. 4E.

Then, as shown in FIG. 4B, 4D or 4F, the reader/writer module 10A shown in, for example, FIGS. 3A and 3B is incorporated just under the swollen portion 22, recessed portion 22B or mark 25 provided in the housing 21. As described above, the module 10A includes the module substrate 11, flexible circuit board 15 provided with the loop antenna 12, circuit part 13 and magnetic sheet 14.

Therefore, the user of the IC card 5 simply places the IC card 5 on the swollen portion 22 formed on the upper surface 21A of the housing 21 of the electronic equipment 20 or holds the IC card 5 against the swollen portion 22 to exchange the data stored in the peripheral circuit 8 of the IC card 5 with the electronic equipment 20. Due to the action of the magnetic sheet 14 provided for the reader/writer module 10A of the IC card, further, the performance of the loop antenna 12 is not adversely affected even if the metallic member 23 happens to exist in the electronic equipment 20.

Figure 5:
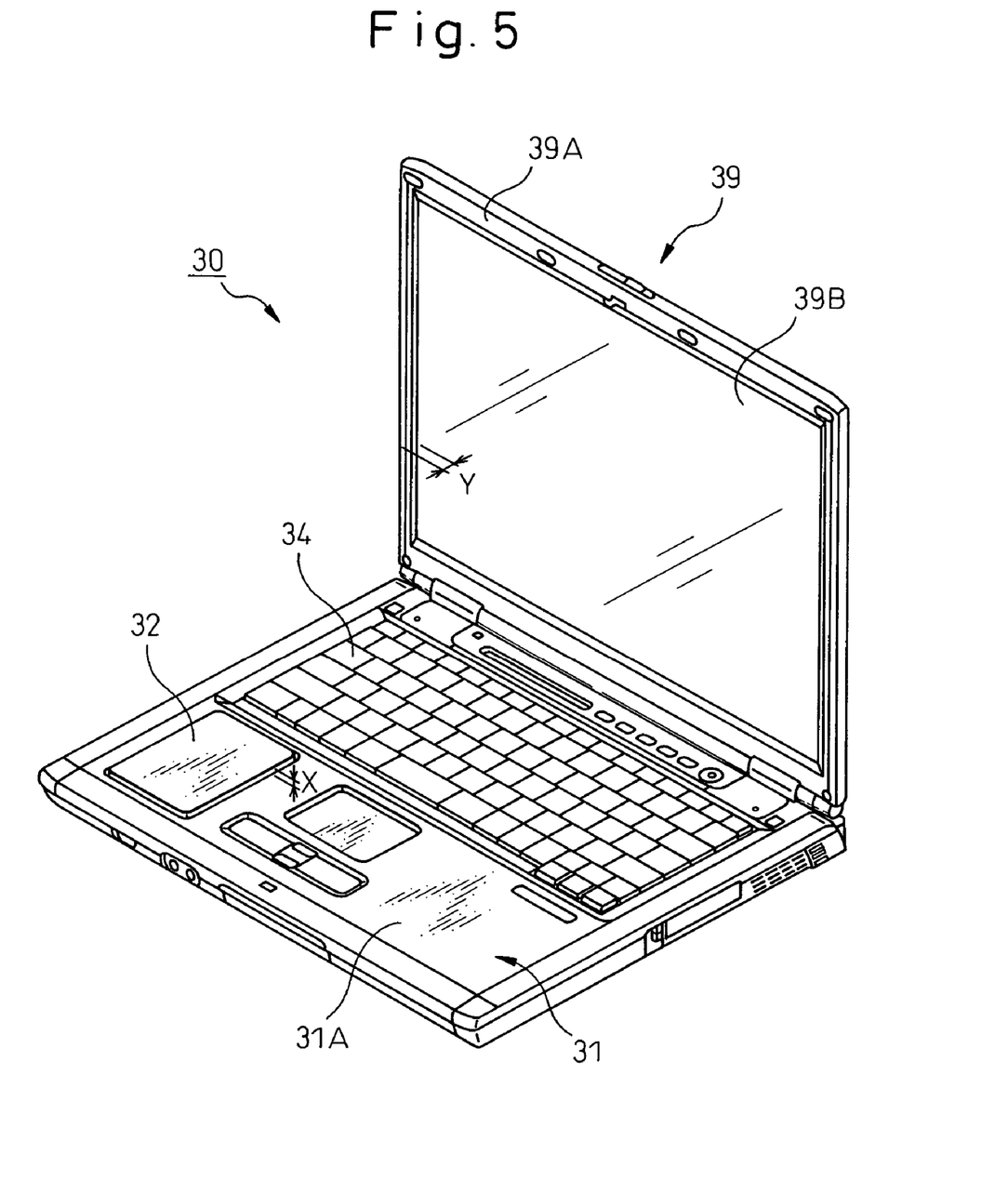
FIG. 5 is a perspective view illustrating an embodiment of a notebook computer incorporating the reader/writer module for IC cards of the present invention.

FIG. 5 illustrates an embodiment of when the electronic equipment incorporating the reader/writer module 10 or 10A for IC cards of the invention is a notebook computer 30. In this case, the reader/writer module 10 or 10A for IC cards is incorporated in a portion on the left side of a palm rest portion 31A neighboring the keyboard 34 in the housing 31 of the notebook computer 30. In this embodiment, a swollen portion 32 is provided on a portion on the left side of the palm rest 31A of the housing 31 for accommodating the reader/writer module 10 or 10A for IC cards. The swollen portion 32 has an outer shape nearly in agreement with the outer shape of the IC card.

A height X of the swollen portion 32 from the palm rest portion 31A is smaller a height Y of the frame 39A of the display of the computer 30 from the screen 39B.

According to this constitution, the user who uses an IC card holds the IC card at the swollen portion 32 or places the IC card on the swollen portion 32 to enhance the recognition factor of the IC card.

Figure 6:
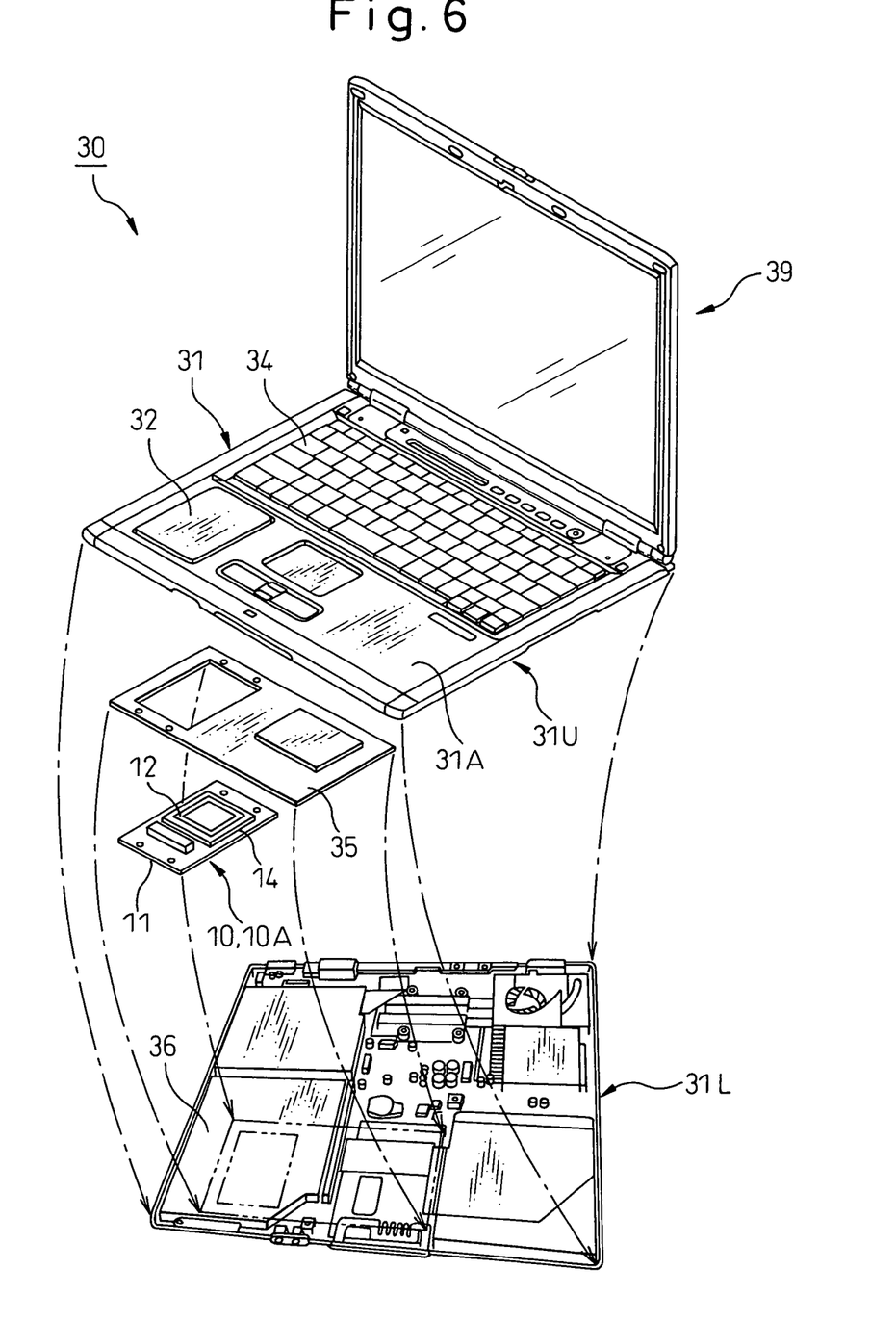
FIG. 6 is a disassembled perspective view illustrating the position of the reader/writer module for IC cards incorporated in the notebook computer shown in FIG. 5.

FIG. 6 illustrates a state where the housing 31 of the notebook computer 30 shown in FIG. 5 is divided into upper and lower portions. The upper housing 31U includes the keyboard 34 and the swollen portion 32 formed on the palm rest portion 31A. The lower housing 31L includes a power source circuit, a floppy disk drive, a hard disk and an optical disk drive such as CD-ROM, which are usually covered by a metal housing.

In the thus constituted notebook computer 30, the reader/writer module 10 or 10A for IC cards of the present invention is attached by screws onto a metal frame 35 at four portions just under the swollen portion 32 of the housing 31. The position of the metal frame 35 in the lower housing 31L is indicated by a two-dot chain line.

In this embodiment, as will be understood from the drawing, when the reader/writer module 10 or 10A for IC cards is incorporated in the notebook computer 30, the optical disk drive 36 is positioned just under the reader/writer module 10 or 10A for IC cards, and the housing thereof is made of a metal. Even in this case, in the reader/writer module 10 or 10A for IC cards of the invention, the loop antenna 12 is supported by the magnetic sheet 14 and is arranged on the module substrate 11, and is not adversely affected by the metallic housing of the optical disk drive 36.

Figure 7:
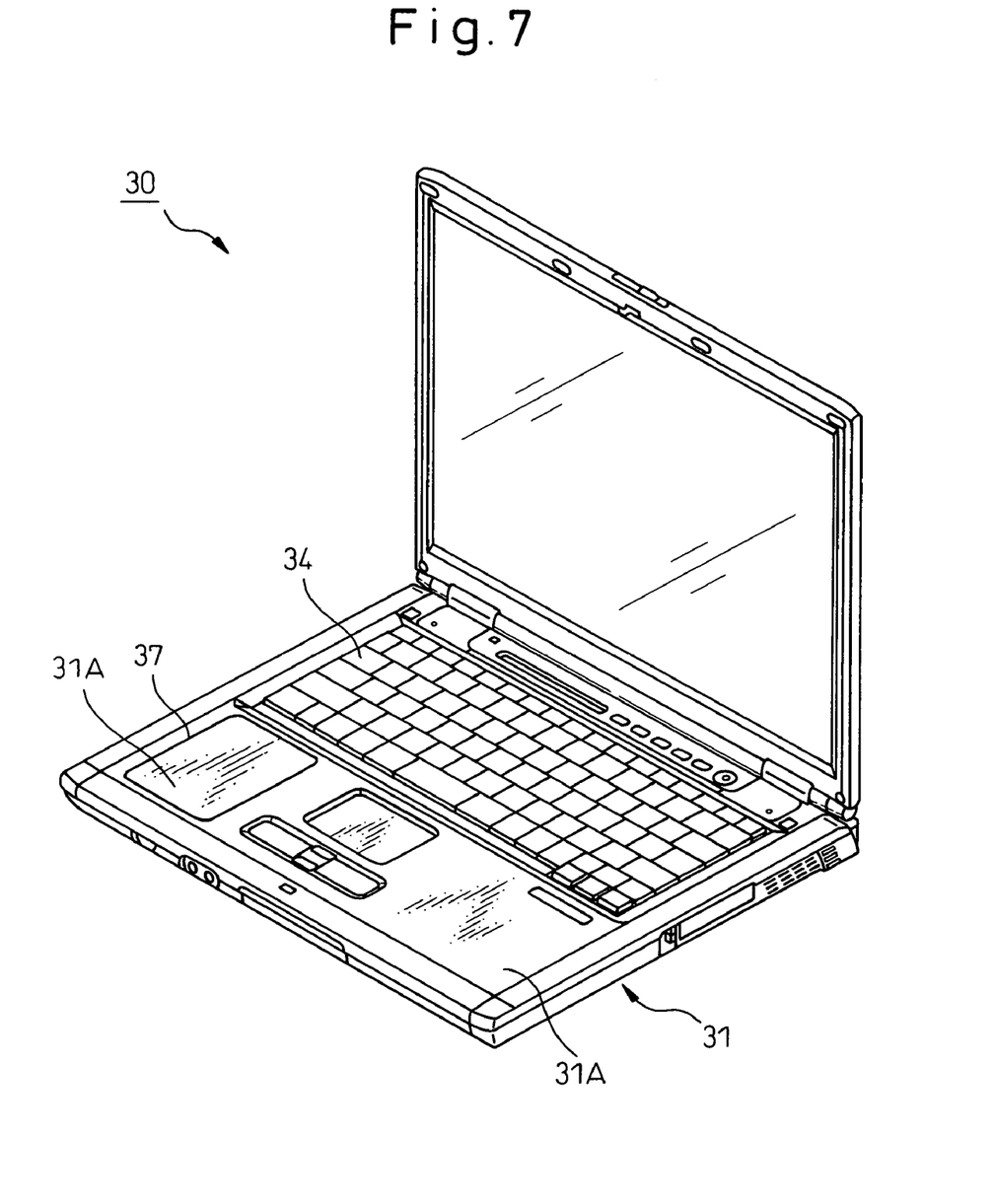
FIG. 7 is a perspective view illustrating another embodiment of the notebook computer incorporating the reader/writer module for IC cards of the present invention.

FIG. 7 illustrates another embodiment of the notebook computer 30 incorporating the reader/writer module 10 or 10A for IC cards of the present invention. In this embodiment, a mark 37 indicating a position for holding up the IC card is formed on the housing 31 at a position where the reader/writer module 10 or 10A is incorporated, i.e., formed on a portion on the left side of the palm rest portion 31A. A picture or an instruction may be printed as the mark 37. The palm rest portion 31A having the mark 37 is flat like other palm rest portions 31A.

In this constitution, too, the user of the IC card 5 shown in FIG. 4A may hold the IC card 5 at the mark 37 or may place the IC card 5 on the mark 37 to enhance the recognition factor of the IC card 5.

Figure 8A:
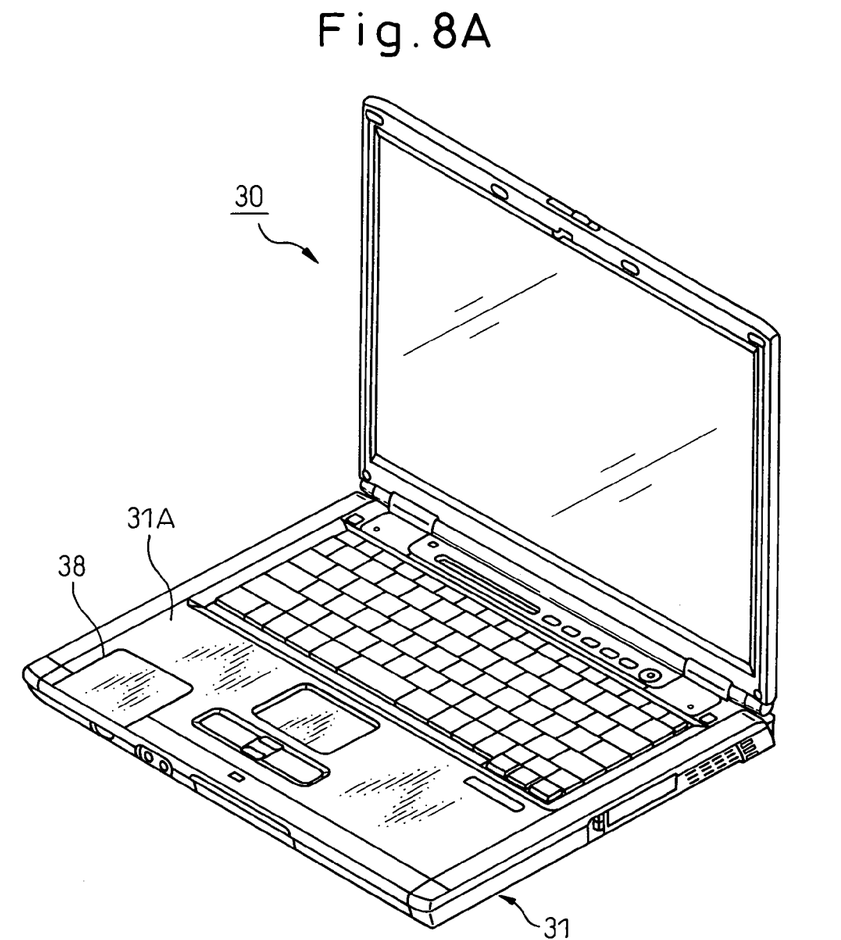
FIG. 8A is a perspective view illustrating a further embodiment of the notebook computer incorporating the reader/writer module for IC cards of the present invention.
Figure 8B:
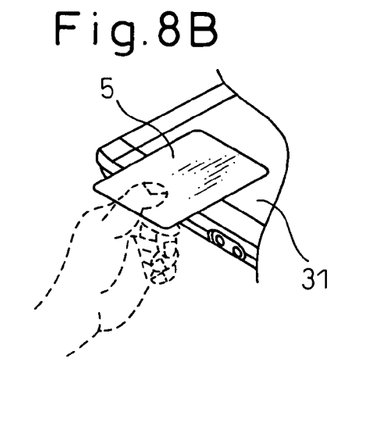
FIG. 8B is a view illustrating a state where an IC card is held against the notebook computer shown in FIG. 8A.
Figure 8C:
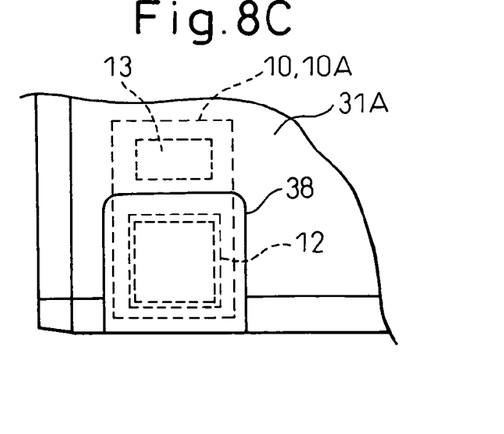
FIG. 8C is a plan view of a portion illustrating a position of the IC card in the housing of the reader/writer module of the invention incorporated in the notebook computer shown in FIG. 8A.

FIGS. 8A to 8C illustrate a further embodiment of the notebook computer 30 incorporating the reader/writer module 10 or 10A for IC cards of the present invention. In this embodiment, as shown in FIG. 8C, the reader/writer module 10 or 10A is so positioned that the loop antenna 12 in the reader/writer module 10 or 10A is located close to the edge of the housing 31.

A position for holding up the IC card 5 is marked as designated at 38 on the palm rest portion 31A of the housing 31 of the notebook computer 30. The mark 38 does not represent the whole shape of the IC card 5 but represents the shape of a portion thereof.

As a result, as shown in FIG. 8B, the data can be read/written from, and onto, the IC card 5 from the computer 30 in a state where the IC card 5 is partly located outside the housing 31, i.e., in a state where the user is holding the IC card 5 in his hand.

In this constitution, the user who uses the IC card 5 may hold up part of the IC card 5 aiming at the mark 38 without the need of placing the IC card 5 on the computer 30, to easily read and write the data from, and onto, the IC card 5 or to easily transmit the data from the IC card 5 to the computer 30.

Here, it can be contrived to form the module substrate 11 in a small size by omitting the module substrate 11 from the portion under the magnetic sheet 14. In this case, however, a new part is necessary for supporting the loop antenna 12, and screws must be used for securing a part for supporting the loop antenna 12. Further, screws are made of metal and can affect the communication. Therefore, the screw positions cannot be used for the antenna deteriorating the quality of communication. Therefore, this constitution is not desirable.

In the foregoing was described the embodiment of the present invention. The invention, however, may further be constituted in a manner as described below.

The above-mentioned module, which is the access device of the invention, has both a function for reading the IC card and a function for writing thereon. However, the module may have either the reading function or the writing function provided it is accessible to the data held by the IC card.

In the foregoing was described a card as the data-holding body accessible by the access device of the present invention. However, the access device of the invention may be the one accessible to a data-holding body other than the card. For example, the data-holding body that is accessible may not be in the form of a card but may be an electronic equipment (cell phone or small data terminal) incorporating the substrate mounting the above-mentioned loop antenna, IC chip and memory. The memory, too, may be the one that also works as an auxiliary storage unit that is usually used for the processing in the electronic equipment. Further, the IC chip, too, may be the one that also works as a CPU that is usually used for the processing in electronic equipment. The antenna is not limited to the loop antenna but may be the one of any other form provided it is accessible from the access device.

In the foregoing was exemplified the magnetic sheet as a magnetic layer provided on the substrate of the access device of the invention, which, however, may be in any form or in any kind, such as a plate or a jelly provided it is capable of supporting the antenna. Further, though a picture or an instruction was printed as the mark 37, a groove corresponding to the circumference of the data-holding body may be formed in the palm rest portion 31A so as to be corresponded to the portion where the reader/writer module 10 or 10A is incorporated.

Figure 9:
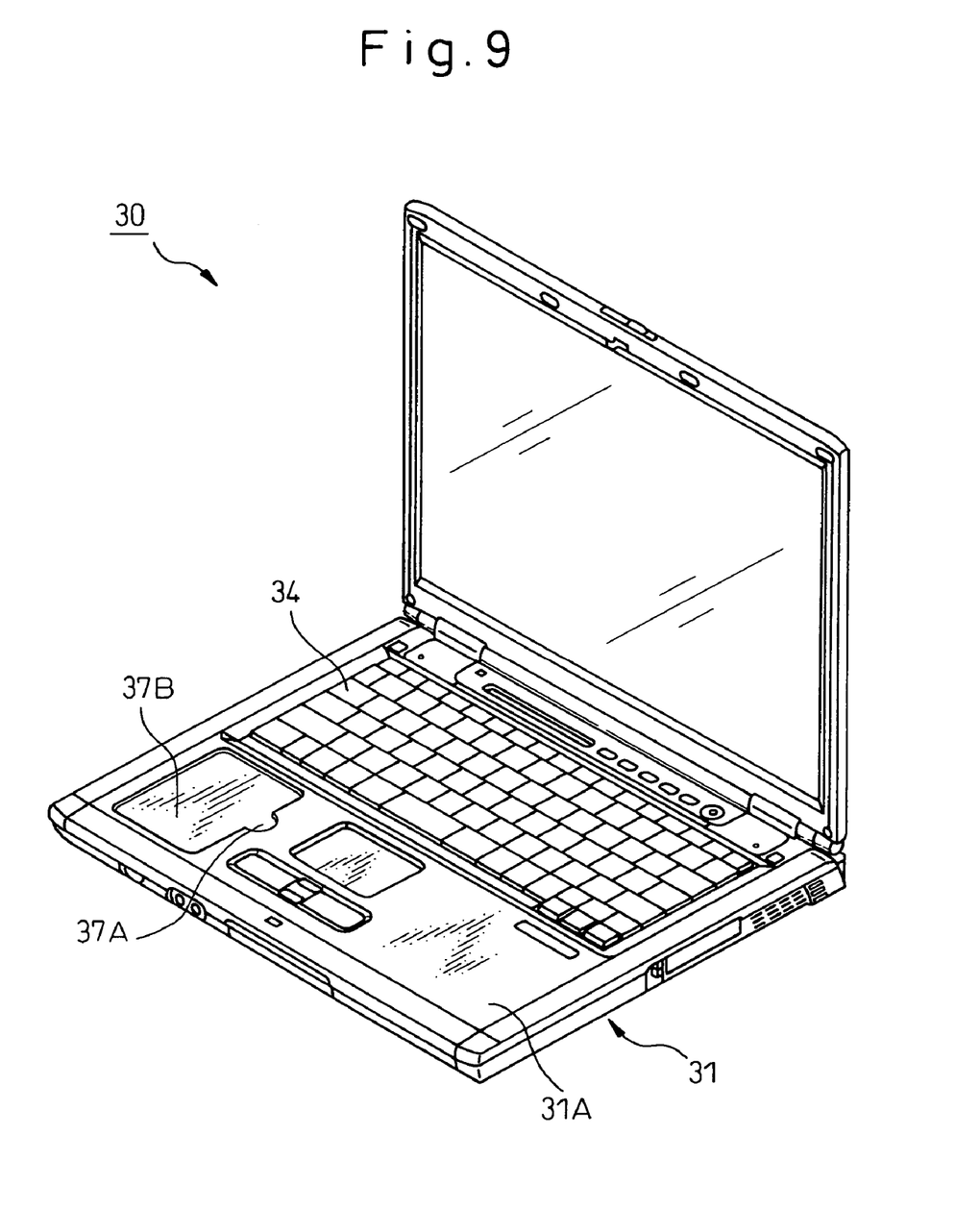
FIG. 9 is a perspective view illustrating a modified example of the notebook computer incorporating the reader/writer module for IC cards of the invention shown in FIG. 7.

FIG. 9 illustrates a modified example of the notebook computer 30 incorporating the reader/writer module 10 or 10A for IC cards of the invention shown in FIG. 7. In this modified example, a shallow recessed portion 37B for accommodating the IC card 5 is provided in a portion on the left side of the palm rest portion 31A. The depth of the recessed portion 37B is smaller than the thickness of the IC card 5. A groove 37A may be provided along the edge of the recessed portion 37B for easily taking out the IC card 5 accommodated in the recessed portion 37B.

In this constitution, too, the user of the IC card 5 may hold the IC card 5 at the recessed portion 37B or may place the IC card 5 in the recessed portion 37B to enhance the recognition factor of the IC card 5.

Figure 10:
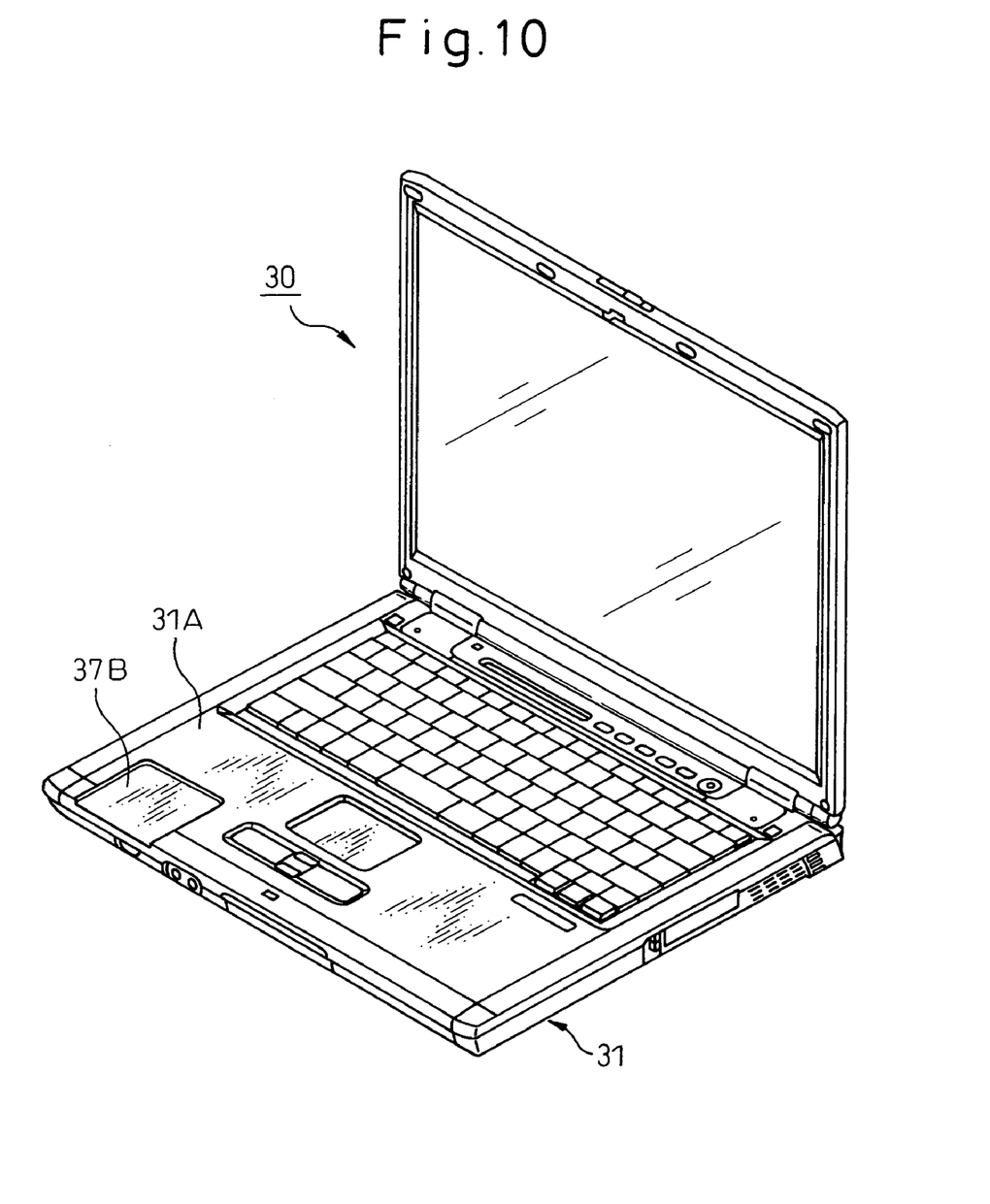
FIG. 10 is a perspective view illustrating a modified example of the notebook computer incorporating the reader/writer module for IC cards of the invention shown in FIG. 8A.

FIG. 10 illustrates a modified example of the notebook computer 30 incorporating the reader/writer module 10 or 10A for IC card of the invention shown in FIG. 8A. In this modified example, the recessed portion 37B is formed in the portion of the mark 38 drawn on the palm rest portion 31A of the housing 31 of the notebook computer 30 shown in FIG. 8A. In this modified example, too, the data can be read/written from, and onto, the card 5 from the computer 30 while the user is holding the IC card 5, by hand, in the manner described with reference to FIG. 8B.

What is claimed is:

1. An electronic equipment, comprising:
   an access device having a function of reading a data-holding body that is accessible in a non-contacting manner and/or a function for writing thereon, and including a circuit board, a magnetic layer provided on a predetermined region on one surface of said substrate, an antenna supported on said magnetic layer, and a circuit component mounted on a region, except adjacent to said magnetic layer on said substrate, and connected to said antenna; and
   a housing of said electronic equipment that incorporates said access device, wherein:
      part of the housing of said electronic equipment is uniformly swollen in the shape of said data-holding body so that the data-holding body can be placed thereon, and
      the access device for said data-holding body is incorporated on the side of the back surface of said swollen portion.

2. An electronic equipment according to claim 1, wherein:
   said electronic equipment is a notebook computer;
   said swollen portion is provided on the palm rest portion neighboring the keyboard of said computer; and
   the height of said swollen portion is selected to be not larger than a step between the display of said computer and a frame portion surrounding the display.

3. An electronic equipment, comprising:
   an access device having a function of reading a data-holding body that is accessible in a non-contacting manner and/or a function for writing thereon, and including a piece of circuit board, a magnetic layer provided on a predetermined region on one surface of said substrate, an antenna supported on said magnetic layer, and a circuit component mounted on a region, adjacent to said magnetic layer, on said substrate, and connected to said antenna; and a housing of said electronic equipment that incorporates said access device, wherein:

the housing of the electronic device, at the portion where the access device for said data-holding body is incorporated, is marked to indicate the position where the data-holding body is to be held, and said access device being incorporated in said housing at a position where said data-holding body can be held from the outer side.

4. An electronic equipment according to claim 3, wherein said magnetic layer mounting said antenna of the access device for said data-holding body is positioned on a portion close to the edge of said housing, enabling said data-holding body to be accessible in a state where part of said data-holding body is positioned on the outer side of said housing.

5. An access device having a function for reading a data-holding body comprising an IC card, that is accessible in a non-contacting manner, and/or a function for writing thereon, comprising:

a circuit board;

a magnetic layer provided on a predetermined region on one surface of said substrate;

an antenna supported on said magnetic layer; and a circuit component mounted on a region, adjacent to said magnetic layer, on said substrate, and connected to said antenna;

said access device being incorporated in a housing;

a recessed portion formed in said housing and uniformly dented in the shape of said IC card, so that the IC card can be accommodated therein; and said access device is incorporated on the side of the back surface of the recessed portion.

6. An electronic equipment according to claim 5, wherein:

said electronic equipment is a notebook computer;

said recessed portion is formed in the palm rest portion neighboring the keyboard of said computer; and the depth of said recessed portion is selected to be not larger than the thickness of said IC card.

7. An electronic equipment according to claim 6, wherein:

said recessed portion is located at a portion close to the edge of said housing; and said IC card is accessed by said access device in a state where part of said IC card is positioned on the outer side of said housing.

* * * * *

UNITED STATES PATENT AND TRADEMARK OFFICE
CERTIFICATE OF CORRECTION

PATENT NO.      : 7,458,511 B2  
APPLICATION NO. : 11/041249  
DATED           : December 2, 2008  
INVENTOR(S)     : Tsuyoshi Takimoto

Page 1 of 1

It is certified that error appears in the above-identified patent and that said Letters Patent is hereby corrected as shown below:

Column 1, Line 10, change "Nov. 8, 2004" to --Oct. 8, 2004--.

Signed and Sealed this

Third Day of March, 2009

JOHN DOLL  
*Acting Director of the United States Patent and Trademark Office*